March 22, 1932.  H. F. KIENEMAN  1,850,676

HOSE REEL

Filed Sept. 29, 1930  2 Sheets-Sheet 1

INVENTOR.
HARRY F. KIENEMAN
BY
C. M. Shigley
ATTORNEY.

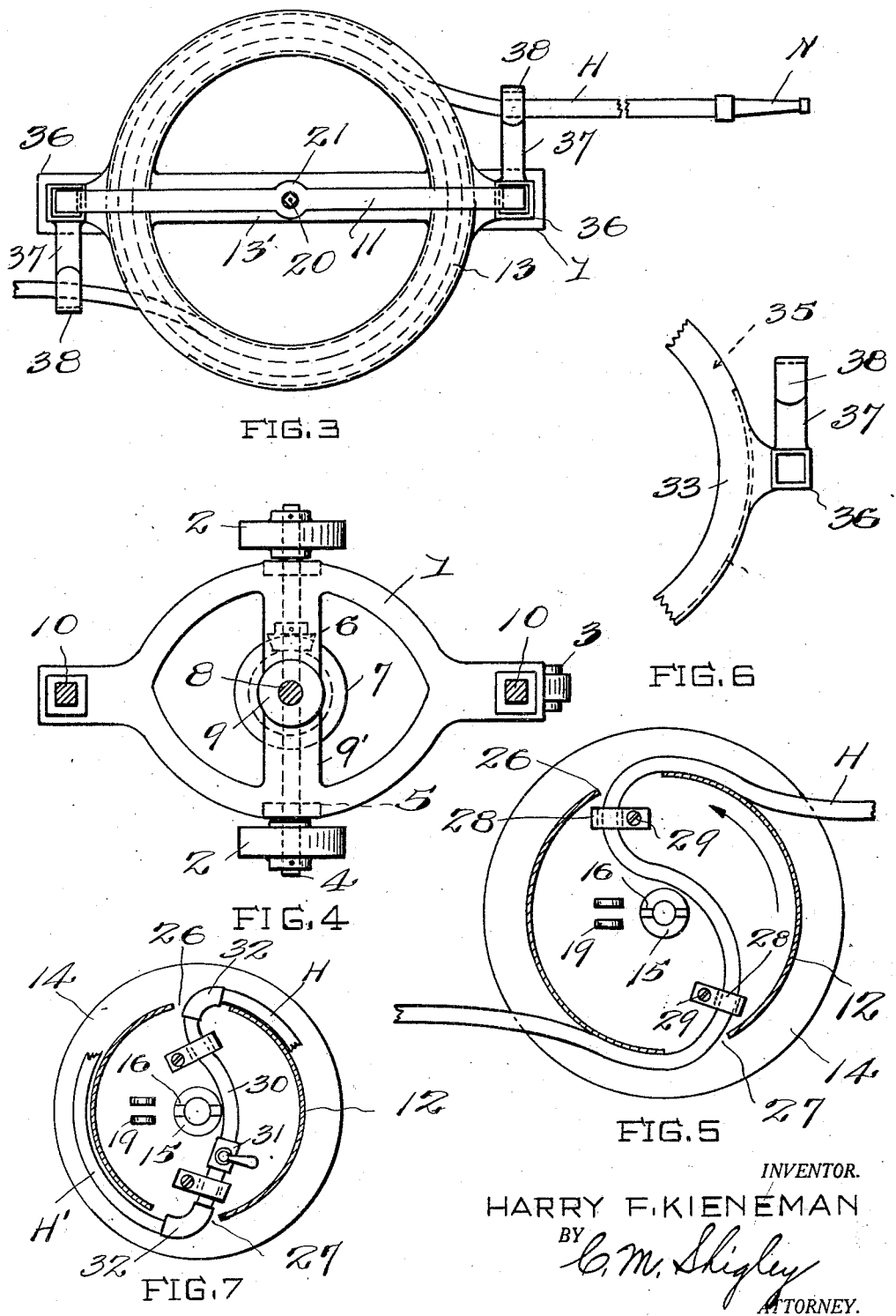

Patented Mar. 22, 1932

1,850,676

UNITED STATES PATENT OFFICE

HARRY F. KIENEMAN, OF CINCINNATI, OHIO

HOSE REEL

Application filed September 29, 1930. Serial No. 485,195.

My present invention relates to improvements in hose reels of the type adapted to be trundled over the ground for the purpose of winding and unwinding the hose on and off a winding drum that is revolved by tractive power developed in the hose reel or appliance. The appliance of my invention is adapted especially for use with rubber hose of the type used to sprinkle gardens, lawns and other grassy plots. As is well known, the structure of this type of hose possesses elasticity or resiliency to such an extent as to maintain its tubular form and prevent flattening of the hose as it is wound on the drum. In carrying out my invention this type of hose can be wound or coiled upon the drum of the reel in such manner as not to obstruct the free flow of water through the coiled or wound hose, and on the other hand, the water may freely flow through the portion of the hose that is wound on the drum while the hose is being used to sprinkle a lawn or water a garden.

The carriage of the reel, which is supplied with supporting wheels and a pilot wheel, and to which the hose is attached, is located approximately midway between the nozzle end or free end of the hose and the attaching end which is secured to the water supply faucet or other water pipe fitting, and the hose drum of the carriage is adapted to alternately wind and unwind both ends of the attached hose, depending on the direction of travel of the carriage toward or away from the stationary faucet or other fitting to which the hose is attached. The hose is wound upon the drum by pushing or pulling the carriage and its reel toward the faucet, and the hose may be unwound from the drum by pulling on the nozzle end of the hose, away from the faucet or supply pipe fitting.

While I have illustrated and referred to the hose reel as a convenient wheeled appliance for facile manipulation in winding and unwinding rubber garden hose for sprinkling purposes, it will be understood that the hose and appliance may be utilized for various other purposes when desired.

The invention consists in certain novel combinations and arrangements of parts as will hereinafter be more fully set forth and claimed. In the accompanying drawings I have illustrated one complete example of the physical embodiment of my invention in which the parts are combined and arranged according to the best mode I have thus far devised for the practical application of the principles of my invention.

Figure 3 is a top plan view of the appliance.

Figure 4 is a plan view of the carriage or wheeled frame of the reel, taken as indicated at line 4—4 of Figure 2.

Figure 5 is a transverse sectional view of the rotary hose drum, showing the relation of the hose thereto.

Figure 6 is a detail, fragmentary view of one of the guides for the hose.

Figure 7 is a plan view of the carriage showing the connection between two sections of hose, when such are used.

Figures 1, 8:
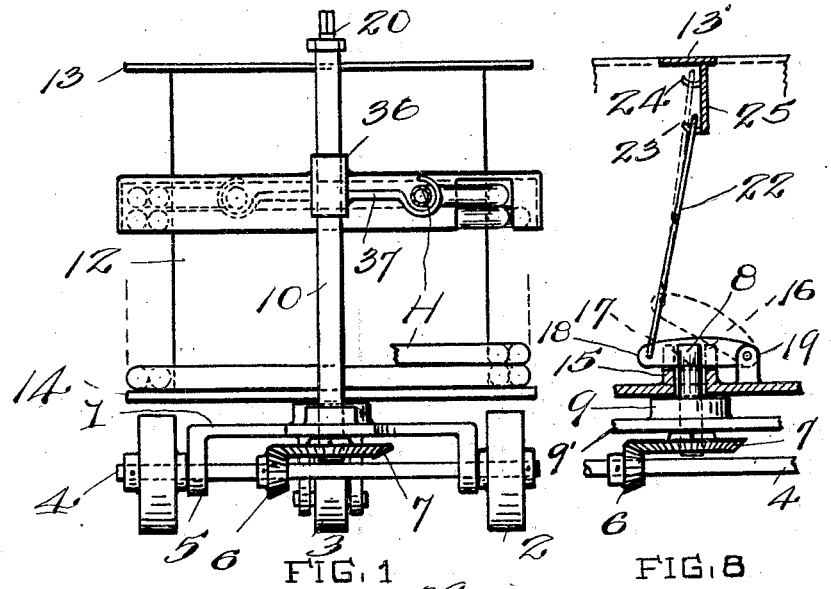
Figure 1 is a view of the appliance embodying my invention, showing the rear end, or the end toward the faucet or water pipe fitting to which the hose is attached for the supply of water.
Figure 8 is a detail view, partly in section, showing parts of the driving mechanism between the traction wheels of the carriage and the revolvable hose drum.

In carrying out my invention I preferably employ a carriage or wheeled frame 1, which, as best shown in Figure 4 is of oval shape with front and rear extensions, and this carriage or frame is supported on two spaced traction wheels 2, 2, and a front swivel or pilot wheel 3, the wheels of course being located beneath the carriage, or frame.

The two spaced traction wheels are mounted on the ends of a shaft 4 that revolves in bearings 5 of the carriage, and a bevel pinion 6 of this shaft transmits power from the carriage shaft, through a horizontal bevel gear 7 mounted on the upright or vertical stud shaft 8 that is journaled in and located to project above a bearing 9 rigid with a cross bar 9' of the carriage.

The carriage is thus formed with an oval shaped plate that is open except for the cross bar 9', and the extensions of this plate 1 each support an upright post as 10, 10 one at the front and one at the rear of the carriage. These posts are joined at their top ends by a cross brace 11, extending in direction opposite to that of the bottom cross bar 9' of the carriage, and the posts are preferably, although not necessarily, square in cross section as indicated in Figure 4.

A cylindrical drum 12 is mounted to revolve on its vertical axis in the carriage, and as shown this drum is open, and provided with an upper or top ring 13 connected across its diameter by a cross bar 13', and a closed circular bottom 14. The ring and the bottom both project beyond the periphery of the cylindrical drum and these projecting portions form annular flanges between which the hose H is "laid" or wound on the exterior of the drum, and of course the hose is also unwound from the drum.

As best seen in Figures 5, 7, and 8, the bottom 14 of the drum, at its upper or inner side, is fashioned with a central open bushing or hub 15, and in the top face of the hub are alined notches 16. The drum is mounted on the shaft 8 with the bushing fitting over the top end of the shaft, and the top end of the shaft is provided with a kerf or notch 17, which, when alined with the notches 16, receives a latch 18 that also engages in the notches 16 to couple the drum for rotary movement with the shaft 8.

The latch is pivoted at 19 on the upper face of the bottom of the drum and it is gravity-actuated to fall into the alined notches to provide an effective coupling for the drum with its shaft.

At its upper end the drum is provided with a central stud shaft 20 journaled in a bearing 21 in the cross bar 11 of the carriage.

The drum may be uncoupled from its shaft if and when necessary or desirable, by means of a link 22 pivoted to the latch, and the upper end of the link may be suspended over a hook 23 when the drum is coupled, or suspended over a hook 24 when the drum is uncoupled. These hooks are rigidly supported on a vertically arranged cross plate 25 that is rigid with the cross bar 13' of the drum ring 13. In Figure 8 the drum is shown coupled with the shaft 8 and the link is suspended on the hook 23, as indicated in full lines. By dotted lines in said figure of the drawings, the link is shown suspended over the hook 24 and the latch is lifted to uncoupled position with relation to the shaft.

The hose H is of the usual garden type and provided with a nozzle or sprinkler N at its free end, while the other end of the hose is provided with the usual coupling nut C for attachment to a faucet or other water-pipe fitting.

In the cylindrical wall of the drum, near its bottom, are provided a pair of oppositely arranged slots or openings 26 and 27, and the hose H is passed transversely through the drum, one end projecting thru the slot 26 and the other end through slot 27, with the drum and its carriage located at approximately midway the length of the hose.

Within the drum the hose is fastened to the bottom 14 by cleats or clamps 28, 28 one at each side of the center of the drum, and the clamps are secured as by screws 29 to the bottom of the drum. The portion of the hose within the drum forms an irregular S-shape, and the bends are such as to avoid breaking down the walls of the hose, while at the same time providing for a free flow of water through the hose at all times. The hose is fastened to the drum with sufficient rigidity as to withstand a pull on either end of the hose, when the carriage is trundled by hand, as well as when the carriage is pulled by hand power applied to either end of the hose. In Figures 5 and 7 it will be seen that the two ends of the hose are wound on the drum when the latter is turned counter-clockwise as indicated by the arrow, and the hose is unwound from the drum by a pull on the right end H in both Figures 5 and 7, which pull turns the drum clockwise.

In Figure 7, two sections of hose H and H' are shown, instead of the one-piece hose in Figure 5. In Figure 7 the two sections are connected to a metal pipe as 30, which is secured or fastened by the clamps 28 to the bottom of the drum, and a drain cock 31 may be used in the metal pipe to drain the hose coiled on the drum. At the ends of the pipe 30 are provided metal elbows 32 to which the ends of the hose H and H' are connected in suitable manner, and it will be apparent that these metal parts by their presence increase the durability of the hose within the drum, by sustaining the pulls or strains imparted to the hose sections, and by eliminating short bends or sharp turns from the rubber hose.

As indicated in Figure 3 each end of the hose is laid on the drum in a coil, the faucet end of the hose being laid in an inner coil, or against the drum, and the nozzle end of the hose being laid in coils about the coils of the faucet end of the hose. In the formation of these coils, and while the hose is being uncoiled or unwound, the ends of the hose are guided by means of a vertically movable guide ring 33, around and within which each hose end travels as it is being wound or unwound with relation to the drum, thereby preventing any slack in the hose, and at the same time guiding and laying the hose in uniform coils on the drum.

The ring 33, which surrounds the drum, and travels vertically between the flanged ends of the drum, is provided with an exterior annular, downwardly extending flange 34 in which are provided a pair of oppositely arranged notches 35, complementary to the notches or slots 26 and 27 of the drum, and the ends of the hose pass through these notches 35 toward and from the drum as the hose is wound or unwound.

The ring or guide travels vertically of the drum, but is non-rotatable, and the guide ring itself is guided on the two posts 10, 10 by means of bushings 36 which bushings slide up and down on the posts and are rigid with the ring.

The hose ends, as they enter and leave the guide ring are supported, loosely, by arms 37 that are rigid with and extend laterally from the guide bushings or sleeves 36, and at the ends of these arms are provided loops or hooks 38 through which the hose may slide, thus insuring a tangential movement of the hose as it is wound or unwound on or off the drum.

Figure 2:
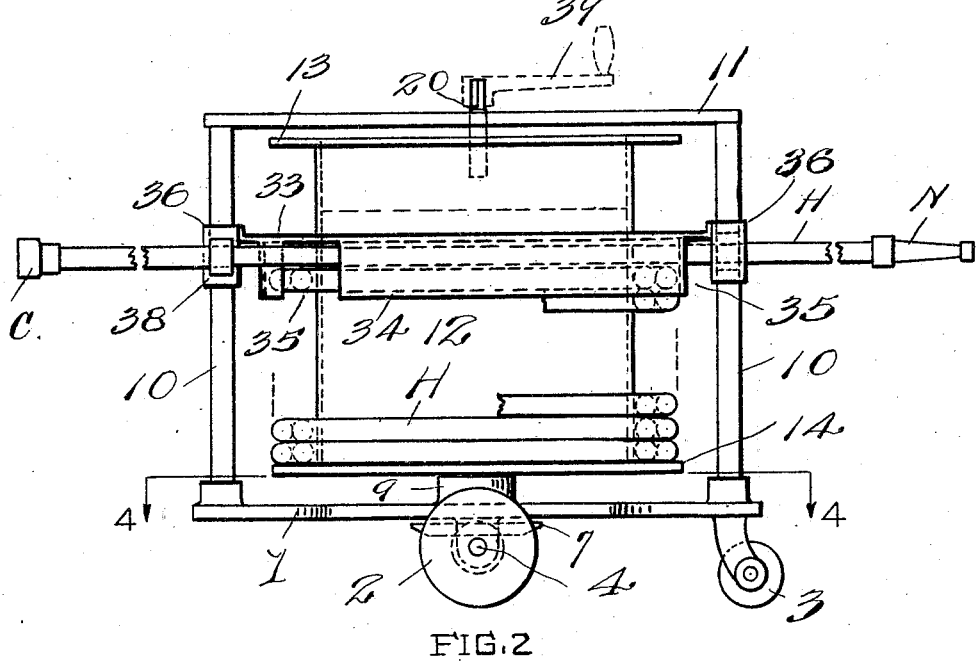
Figure 2 is a side view of the apparatus as seen from the right side in Figure 1.

In Figure 2 a crank handle 39 is indicated by dotted lines as slipped over the upper end of the drum shaft 20, and the drum, when it is uncoupled from its shaft 8, may be turned by the use of this manually operated handle for rotating the drum if and when necessary.

When the reel is not to be used for laying out or reeling in the hose, but is being trundled for transportation from one faucet to another, the latch 18 is lifted to uncouple the drum from the gear shaft or drum shaft, and then the carriage may be pushed or pulled by the hands applied directly thereto, without rotating the drum.

As noted in Figure 3, the faucet end of the hose is wound on the inside coil or next the drum, while the nozzle end is coiled on the inner coil of the hose, for the reason that the outside diameter or periphery of the drum, and the travel of the traction wheels 2, are timed for a constant and continuous winding or unwinding of the hose. By this arrangement and relation of the drum and gearing, the size of the hose may be disregarded, and one or another size or diameter of hose may be wound or unwound on or off the drum with equal facility and smoothness of operation.

Inasmuch as the coils of the hose are located at a higher elevation than the ends of the hose, while the latter is being wound on the drum, the water drains by gravity from the coils down to the ends and is thus prevented from standing in the wound hose.

The preferred form or manner of unwinding the hose is to first attach the inlet end to a faucet, then grasp the nozzle end of the hose and pull out a length of hose sufficient for the purpose. The carriage of course travels one half the distance of the length of the hose pulled out. For winding the hose, the carriage may be pushed or trundled by hand toward the faucet, with the nozzle end dragging freely, and both ends of the hose are wound on the drum.

In the construction of Figure 5, (or if the drain cock of Figure 7 is not used) if the reel has been employed for sprinkling while a portion of the hose remained on the drum in coiled position, under some conditions after the sprinkling operation has been completed, water may still remain in the coiled hose. To drain the water from the hose, the driving mechanism is first uncoupled from the drum, and then the crank handle 39 is applied to the shaft 20, for the purpose of unreeling or unwinding the entire length of hose from the drum. Then the drained hose is again wound upon the drum by use of the manually operated crank handle.

The hose reel, it will be understood, is not limited to use for sprinkling lawns or gardens, but may be used on lawn tennis courts, base ball grounds, and other grassy plots, and in some instances the appliance may be utilized as part of fire-fighting equipment for industrial buildings, office buildings, warehouses, and other places where a portable equipment is desirable or necessary.

While I have, for convenience of description, referred to the use of the hose for sprinkling water, it will be apparent that the hose may be used for conveying compressed air, as for instance in automobile garages, factories, and other similar places; and the appliance may be manufactured in different sizes for the various purposes.

Having thus fully described my invention, what I claim as new and desire to secure by Letters Patent is:—

1. The combination with a wheeled carriage, a rotatable drum mounted on the carriage, a hose attached to the drum and having free ends, and traction operated means for rotating the drum, of a non-rotatable guide member encircling the drum, supports on the carriage on which said member is slidable, means for guiding the hose-ends through and around said member, and means for limiting the sliding movement of said member.

2. In an appliance as described, the combination with a rotary drum having opposed openings in its wall and a hose fixed within the drum with its ends passing outwardly through the openings, a non-rotatable, slidable, annular hose-guide surrounding the drum and supports for said hose guide, and said hose guide having complementary openings in its wall for said hose-ends.

3. The combination with a carriage having a pair of posts and a rotary drum mounted in the carriage having a hose fixed therein with free ends, of an annular hose-guide surrounding the drum, a pair of slide sleeves on said guide for co-action with the posts, guide arms on the sleeves, and guide loops on said arms adjacent openings in the hose-guide for the purpose described.

4. The combination in a portable hose reel with a wheeled carriage, a rotatable hose drum supported on the carriage, and traction operated means for rotating the drum, of a pair of upright posts supported on the carriage, a hose attached intermediate its ends to the drum, and an annular guide member slidable on the posts for laying the hose ends in coils on the drum.

In testimony whereof I affix my signature.

HARRY F. KIENEMAN.